United States Patent
Doshi

(10) Patent No.: US 8,615,731 B2
(45) Date of Patent: Dec. 24, 2013

(54) SYSTEM AND METHOD FOR AUTOMATING THE DEVELOPMENT OF WEB SERVICES THAT INCORPORATE BUSINESS RULES

(76) Inventor: Mohit Doshi, Cupertino, CA (US)

( * ) Notice: Subject to any disclaimer, the term of this patent is extended or adjusted under 35 U.S.C. 154(b) by 1086 days.

(21) Appl. No.: 11/345,824

(22) Filed: Feb. 2, 2006

(65) Prior Publication Data

US 2006/0129605 A1 Jun. 15, 2006

Related U.S. Application Data

(63) Continuation-in-part of application No. 11/211,043, filed on Aug. 24, 2005.

(60) Provisional application No. 60/604,420, filed on Aug. 25, 2004.

(51) Int. Cl.
*G06F 9/44* (2006.01)

(52) U.S. Cl.
USPC .......................................................... 717/106

(58) Field of Classification Search
USPC ............ 717/106–108; 719/328; 715/234–239
See application file for complete search history.

(56) References Cited

U.S. PATENT DOCUMENTS

| | | | |
|---|---|---|---|
| 6,560,633 B1 | 5/2003 | Roberts et al. | |
| 6,631,519 B1* | 10/2003 | Nicholson et al. | 717/169 |
| 6,931,623 B2* | 8/2005 | Vermeire et al. | 717/107 |
| 8,332,524 B2* | 12/2012 | Garfinkle et al. | 709/229 |
| 8,365,189 B2* | 1/2013 | Jackson et al. | 719/313 |
| 8,370,233 B2* | 2/2013 | Kaisermayr et al. | 705/35 |
| 8,374,931 B2* | 2/2013 | Bhatia et al. | 705/35 |
| 8,381,180 B2* | 2/2013 | Rostoker | 717/120 |
| 2001/0025372 A1* | 9/2001 | Vermeire et al. | 717/7 |
| 2003/0229608 A1* | 12/2003 | Reynar et al. | 707/1 |
| 2004/0133876 A1* | 7/2004 | Sproule | 717/105 |

OTHER PUBLICATIONS

Armstrong, Eric et al. "The J2EE™ 1.4 Tutorial." Jun. 17, 2004. Sun Microsystems. pages i-xxxii and 319-344. Downloaded from http://java.sun.com/j2ee/1.4/docs/tutorial-update2/doc/J2EETutorial.pdf on Apr. 7, 2009.*
Sun Microsystems. "The Java™ Web Services Tutorial" Jun. 21, 2004. Sun Microsystems.pp. i-xii, 1-23, and 89-107. Downloaded from http://java.sun.com/webservices/docs/1.4/tutorial/doc/JavaWSTutorial.pdf on Apr. 7, 2009.*
van der Vlist, Eric. "XML Schema." Jun. 25, 2002, O'Reilly Media, Inc. Section 14.2 and Appendix A.8. Retrieved from Proquest Safari Books on Jul. 29, 2010.*

* cited by examiner

*Primary Examiner* — Don Wong
*Assistant Examiner* — Erika Kretzmer
(74) *Attorney, Agent, or Firm* — Aka Chan LLP

(57) ABSTRACT

A system and method for developing web services that incorporate business rules. The system and method includes three frameworks: a Design Time Framework, an Object-Service Framework, and a Run Time Framework. In the Design Time Framework, the system and method includes receiving a business rule in a descriptive markup language from a user and generating source code artifacts in an object oriented programming language based on the business rule. In the Object-Service Framework, the system and method includes relating the generated source code artifacts to a pre-built Business Rules service. Finally, in the Run Time Framework, the system and method includes providing the Business Rules service, wherein the Business Rules service interacts with the generated source code artifacts through the relationship defined by the Object-Service Framework.

14 Claims, 6 Drawing Sheets

SYSTEM AND METHOD FOR AUTOMATING THE DEVELOPMENT OF WEB SERVICES THAT INCORPORATE BUSINESS RULES

CROSS-REFERENCE TO RELATED APPLICATIONS

This application is a continuation-in-part of U.S. application Ser. No. 11/211,043 filed 24 Aug. 2005 and entitled "System and Method for Automating the Development of Web Services", which is incorporated in its entirety by this reference. The Ser. No. 11/211,043 application claims priority to U.S. Provisional Application No. 60/604,420 entitled "System and Method for Automating the Development of Web Services" and filed on 25 Aug. 2004, which is also incorporated in its entirety by this reference.

TECHNICAL FIELD

This invention relates generally to the information technology field, and more specifically to a new and useful system and method for automating the development of web services that incorporate business rules in the information technology field.

BACKGROUND

Web services, which provide capabilities that can be supplied or consumed over the Internet, use a distributed technology that enables application-to-application connectivity without human intervention. Examples of web services include: moving customer information from a customer relationship management ("CRM") system to a portal, delivering a stock quote to a customer, and consolidating inventory information across suppliers to render an aggregated view. These examples partly address larger business problems, such as delivering high-quality customer service, providing subscription based trading services, or automating the interaction between the suppliers and the buyers in a procurement scenario.

A Services Oriented Architecture (or "SOA") makes use of web services, but adheres to certain principles. These principles include: web services that are agnostic to any system, application, location or user; web services that are reusable; and web services that are loosely-coupled such that they can be linked together or unlinked into their individual forms on demand, in real-time and in an automated fashion. A SOA achieves these principles by using a common language (or data format), such as XML, to communicate and interface with one another.

Despite business benefits, line executives have discovered that building web services at an application level is a time consuming and human intensive process. A true SOA application has services and services interaction at the very core of its architecture. However, very few systems and applications are being built from ground-up to meet the principles of SOA. Lack of tools at an application or system level to address this problem often results in these applications becoming monolithic pieces of functionality that are tightly coupled to a particular user interaction model. Even after the services are built, any subsequent modification requires another round of costly re-engineering.

The disadvantages of the typical SOA application include: (1) the business rules and business information encapsulated by the web service, which are often times hard coded, cannot be externalized or shared with other applications; and (2) the micro level architecture, which is rigid, cannot be modified or expanded without encountering extreme difficulty. These disadvantages have put the organizations adopting web services at a competitive disadvantage—not only do these organizations lag behind their competitors who might be rapidly deploying web services, but these disadvantages also increases the development costs of their information technology without delivering the significant return on invention as promised by SOA.

SUMMARY OF THE INVENTION

The invention provides a system and method that is holistic in nature and based on pre-built, abstract frameworks, which reduces or eliminates the disadvantages of a typical SOA application. Instead of focusing on generating code for singular layers in isolation (such as XML messaging, Rules Engine, database schema, or managing data access), the system and method provide generated code consistently across all these tiers and problem areas. Moreover, the code generated for each layer easily interacts with, or transforms itself into, code generated for the adjacent layers. The automated code generation provides organization and consistency of software across the different application layers, which enhances the overall quality of the code and the web service. By augmenting information or static code generation capabilities with business rules oriented code generation, the invention makes it possible to modify existing rules and add new rules and generate the related code without impacting the rest of the application layers. The system and method of the invention supports both design time and run time interpretation of the rules. By offering both the modes, invention gives complete control over performance and flexibility to end users around business rule definition and invocation. Furthermore, the business rules are very loosely-coupled with the overall flow of the application and rest of the application layers.

The system and method of the invention facilitate a response to an incoming event (sent over a network) entirely through configuration. Thus, in effect, users end up configuring the flow of pre-built runtime services that act on auto-generated components in a particular order (defined by the user in a configuration file) to dynamically render web services in run-time. The pre-built services do not require the users to perform any coding or provide any templates to build these services or the run-time framework. Since the invention provides these runtime services to perform the different tasks commonly encountered in rendering a web service, it makes it easy for users to quickly assemble a web service, as opposed to developing it. Thus, the invention significantly reduces the development resources and the human labor costs and time-to-build cycles associated with developing a web service.

DESCRIPTION OF THE PREFERRED EMBODIMENTS

The following description of the preferred embodiment of the invention is not intended to limit the invention to this preferred embodiment, but rather to enable any person skilled in the art of web services to make and use this invention.

1. OVERVIEW OF THE SYSTEM AND METHOD

The invention provides a system and method for automating development of web services. Although the system and method have been described with the use of eXtensible Markup Language ("XML") language and the Java language, the system and method can be used with any suitable markup language and object-oriented programming language. As used in this document, "Java" refers to one or more of the registered JAVA trademarks owned by Sun Microsystems, Inc.

Figure 1:
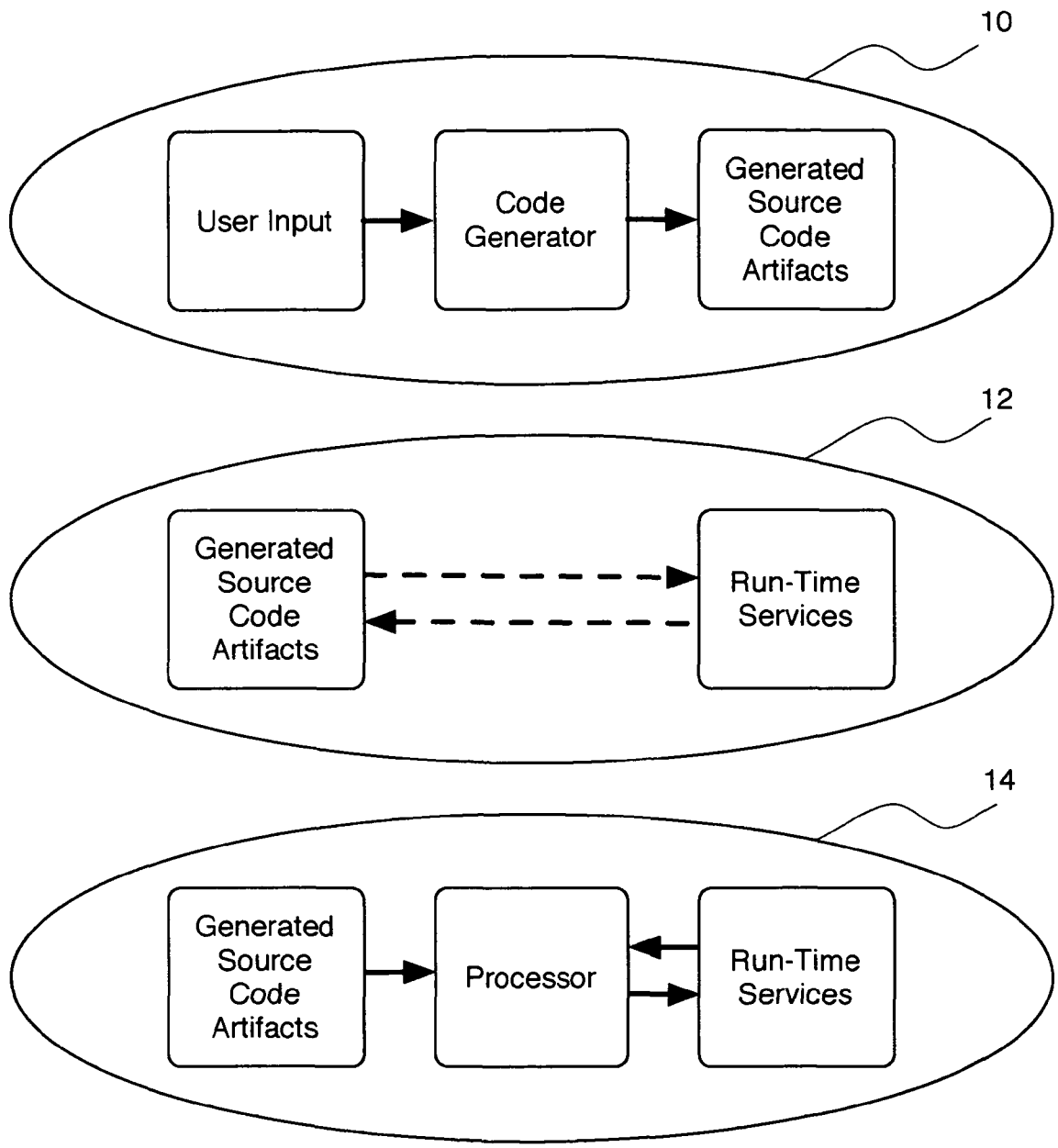
FIG. 1 is a schematic view of the three frameworks of the preferred embodiment of the invention.

As shown in FIG. 1, the system and method include a Design Time Framework 10, an object-Service Framework 12, and a Run Time Framework 14. The Design Time Framework 10 functions to accept information models and structures defined in multiple XML schema files, interpret the XML schema, and generate source code artifacts. For the purposes of this document, "source code artifacts" are computer instructions that can be compiled into binary executable code. The source code artifacts can be classes, routines, or functions, portions of routines or functions, or any structure used to create more source code artifacts that will eventually be compiled into binary executable code. The Design Time Framework 10 also functions to accept business rules (which reference the structures defined in the XML schema file) defined in XML files, interpret these rules, and generate the related source code artifacts. The Object-Service Framework 12 functions to define the base level code structures (i.e. base classes) that serve as the foundation for all generated objects from the XML schema files and the XML rules files. The Run Time Framework 14 functions to bind together pre-built runtime services, user defined configuration files, and the respective code artifacts generated by the Design Time Framework 10 to assemble and render a specific web service. Thus, instead of developing or coding a web service, end users automate (using Design Time Framework 10) and assemble a web service that can respond to a specific event in real-time (through the Run Time Framework 14).

2. DESIGN TIME FRAMEWORK

Figure 2:
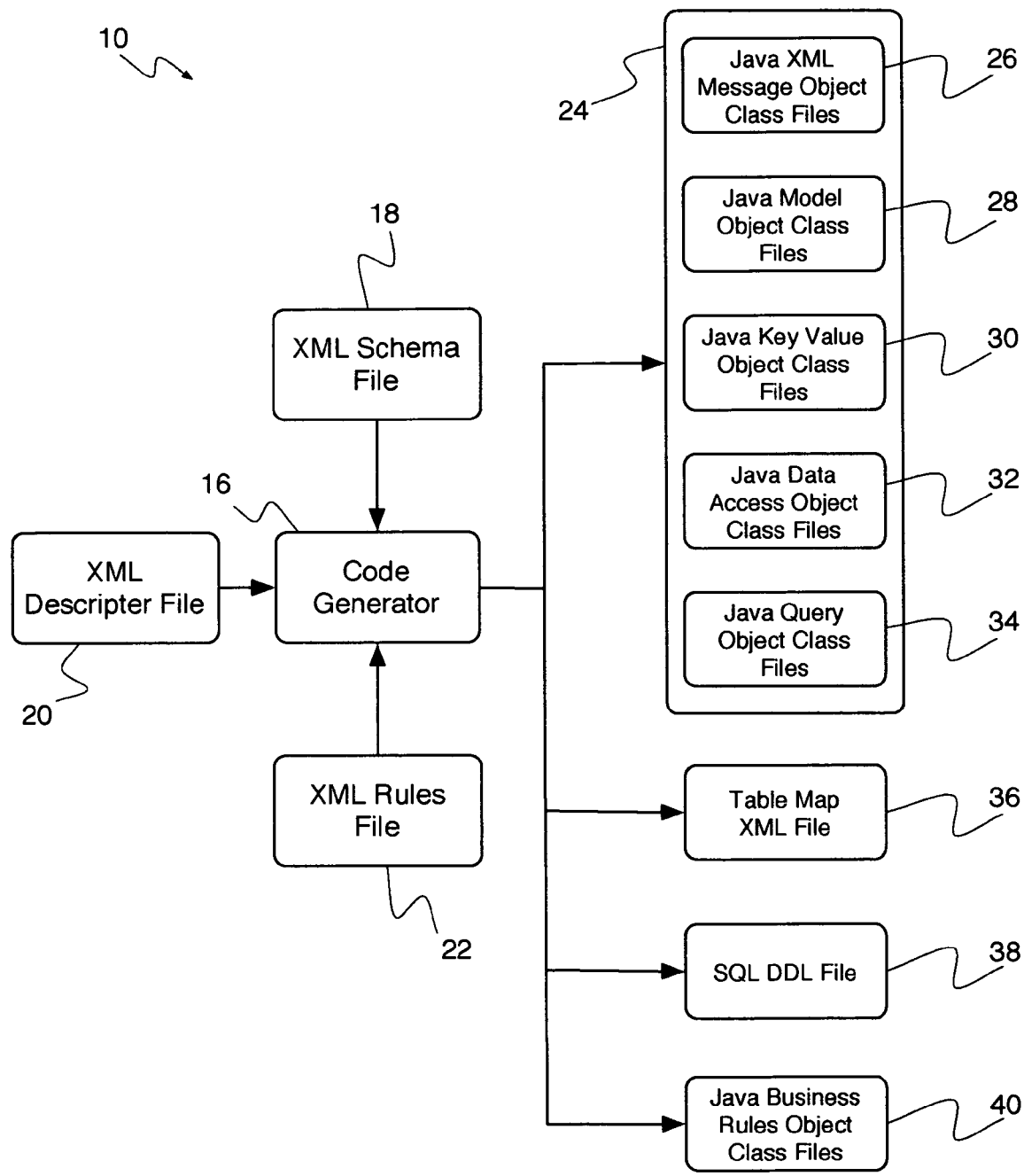
FIG. 2 is a schematic view of the Design Time Framework.

As shown in FIG. 2, the Design Time Framework 10 functions to accept information models and structures defined in multiple XML schema files, interpret the XML schema, and generate source code artifacts. The Design Time Framework 10 also accepts business rules defined in multiple XML files interpret these rules and generate source code artifacts. The Design Time Framework 10 preferably includes a Code Generator 16 that accepts an XML Schema file 18 and an XML Descriptor file 20, traverses through the schema described in the XML Schema file 18 and any other schema files that might be included, examines each type and element definitions in the XML Schema file 18, and automatically generates Java Classes 24 (source code artifacts) for different logical tiers of an architecture. These classes are eventually compiled into binary code. For purposes of this document, the word "class" and the phrase "class file" are used interchangeably. Both classes and class files are source code artifacts. The Code Generator 16 preferably uses the information provided in the XML Descriptor file 20 to determine the Java packages and locations of output directories for the generated artifacts. The Code Generator 16 also accepts an XML Rules File 22 and automatically generates additional code artifacts.

The Java code generated by the Design Time Framework 10 is run-time service agonistic. In other words, the Java code can interface with any run-time service that extends the Object-Service Framework 12 (described below). In this fashion, more Java code can be generated and injected into the system independent of the runtime services, and more runtime services can be implemented independent of the generated Java code.

The XML Schema file 18, which is preferably written by the end user, contains the information structures that will be used, in some shape or form, by the web service. The XML Schema file 18 is defined in a file and can include multiple XML Schema. The information structures defined and described in the XML Schema file 18 are themselves derived from the base information structures defined in a Base XML Schema. The pre-defined Base XML Schema contains the base complex types and their related attributes to represent transient and persistent types of information structures. The XML Schema file 18 may also contain XML schema annotations, which can contain additional required properties.

The XML Descriptor file 20, which is preferably written by the end user, contains the mappings for each schema. The XML Descriptor file 20 preferably includes information such as the schema name, Java package names, locations for the generated code artifacts and any other properties that may be used in the code generation. The schema for the XML Descriptor file 20 is defined by an XML Descriptor Schema. The pre-defined XML Descriptor Schema contains the structure for describing the mappings for each schema.

Figure 3:
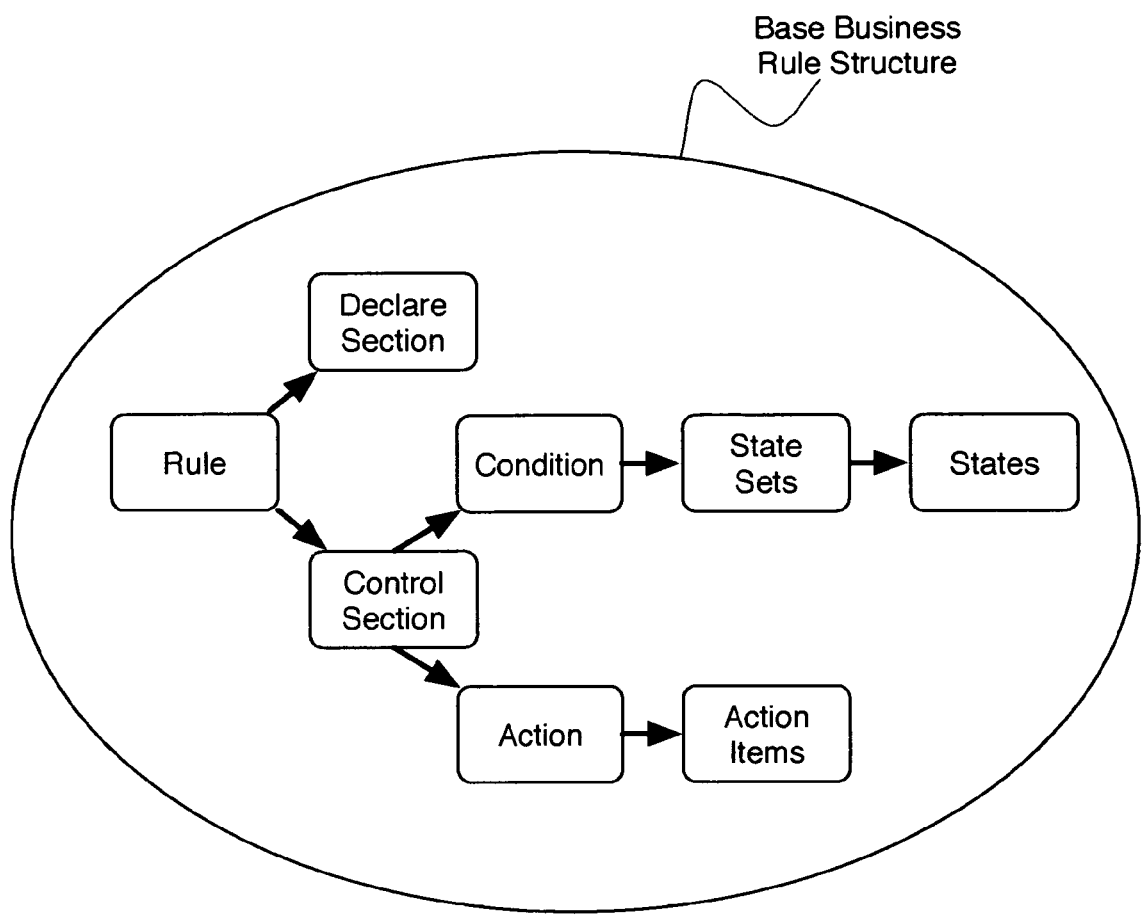
FIG. 3 is a schematic of the Base Business Rule Structure.

The XML Rules File 22, which is preferably written by the end user, contains the business rule definition that would be used as part of the process to fulfill a request. These business rules reference to the instances of the information structures described in the XML Schema File 18. The business rules are generated by the Design Time Framework 10 into Java Business Rules Object Class files 40 which in turn reference the Java Model Object Class 28 instances and are extensions of the abstract classes defined in a Base Business Rule Structure 42. The schema for the XML Rules File 22 itself is defined by an XML Rules Schema. As shown in FIG. 3, the pre-defined XML Rules Schema contains the base types for Rules, Declarations, Controls, Conditions, States, and Actions. Each instance of this schema is made up of many Rules. Each Rule block, which functions as the highest level container for the rules, consists of a Declaration Section and a Control Section (with Conditions and Actions). The Declaration Section functions to allow specification of the rule name and business information that will be used in the Control Section of the rule. The business information declarations are instances of the information structures described in the XML Schema File 18. The Control Section functions to "connect" the Conditions (operating on the business information) and Actions (executed against or using the business information). The Control Sections may include conditional constructs (such as "if-else"), loop constructs (such as "for" or "do-while"), or any other appropriate constructs. Each Condition can be an "AndCondition", an "OrCondition", or any other suitable condition. Each Condition is a collection of StateSets, which can be an "AndStateSet", an "OrStateSet", or any other suitable StateSet. Each StateSet is a collection of States, which encapsulates a boolean condition which needs to be satisfied. Each Action is made up of many ActionItems, which include an action that is executable. The ActionItems are various mathematical operations (such as addition, subtraction, or multiplication), validation operations (such as constraint checking, range checking, data validity checking), logical (such as data or relationship based comparison), data transformation rules (such as concatenation, indexing, aggregating or disaggregating information, conditional or non conditional assignment), technical operations (such as invoking other events or services or business rules that result in higher level conditional flows), and/or any other suitable custom operations defined by the users in well defined interfaces. All the ActionItems operate agnostically across different types of business information structures described in the XML Schema File 18 and declared in the Declaration Section. When a Condition is satisfied, all the ActionItems in an Action are executed. In an AndCondition, all the StateSets need be satisfied. In an AndStateSet all the States need to be satisfied. In an OrCondition any one of the StateSets need be satisfied. In an OrStateSet any one of the States need to be satisfied. The XML Rules File 22 then contains instances of the "Rule" schema defined in the XML Rules Schema.

In the preferred embodiment, as shown in FIG. 2, the Code Generator 16 examines the schema in XML Schema file 18 and generates the following Java classes 24: Java XML Message Object Class Files 26, Java Model Object Class files 28, Java Key Value Object Class files 30, Java Data Access Object Class files 32, and Java Query Object Class files 34. The Code Generator 16 preferably maps every generated Java class 24 to at least one type of Java Class defined in the Object-Service Framework 12. The details of the Object-Service Framework 12 are discussed in Section 3.

In the preferred embodiment, the Code Generator 16 also preferably examines the XML Schema file 18 including the complexType and elements, their related attributes, and any specific annotations, and generates relational representation of the XML Schema file 18 as a Table Map XML File 36 and a SQL DDL File 38.

The Table Map XML File 36 preferably contains mappings between relational tables, the Java Model Object Class files 28, the Java Data Access Object Class files 32, and the relational schema described in SQL DDL File 38 for each persistent complexType in the input XML Schema file 18. The mappings preferably describe metadata characteristics (such as table name, related columns, and Data Access Object name) and attribute level characteristics (such as primary, unique, foreign or index key, whether it can contain null values or not, default values, column type, attribute type, column name, and attribute name). The Table Map XML File 36 is also preferably used by the Code Generator 16 as an input to generate the Java Data Access Object Class files 32 and the Java Query Object Class files 34.

The SQL DDL File 38 preferably contains the definitions for the schema, tablespace, tables, table hierarchy, columns, indexes, primary keys, foreign keys, unique keys and their related physical storage and column level properties. The SQL DDL File 38 is preferably used to create a relational physical schema instance in a database. The Code Generator 16 preferably generates one or more relational tables for every complexType that extends a base persistent type in XML Schema file 18. Inheritance relationships are preferably not collapsed into single relational tables. Instead the Design Time Framework 10 preserves structures that have inheritance relationships between them as separate relational tables.

In the preferred embodiment, the Code Generator 16 also accepts an XML Rules File 22 and generates Java Business Rules Object Class files 40. The Java Business Rules Object Class files 40 function to provide the necessary mapping between the business rules and related Model Object instances on which the rules need to be evaluated and executed. The Java Business Rules Object Class files 40 contain information that is specific to each derived instance of the base Business Rule Object, such as references to the specific Java Model Object Class files 28 against which the conditions would be evaluated, references to the specific Java Model Object Class files 28 upon which the action would be executed, and the different possible conditional paths for each rule that has to be evaluated. Thus, instead of embedding the business rules directly in the Java Model Object Class file 28, the rules are externalized and decoupled in the Java Business Rules Object Class 40. This makes it easier to introduce new rules into the system without modifying the Java Model Object Class file 28.

3. OBJECT-SERVICE FRAMEWORK—GENERATED OBJECTS

Figure 4:
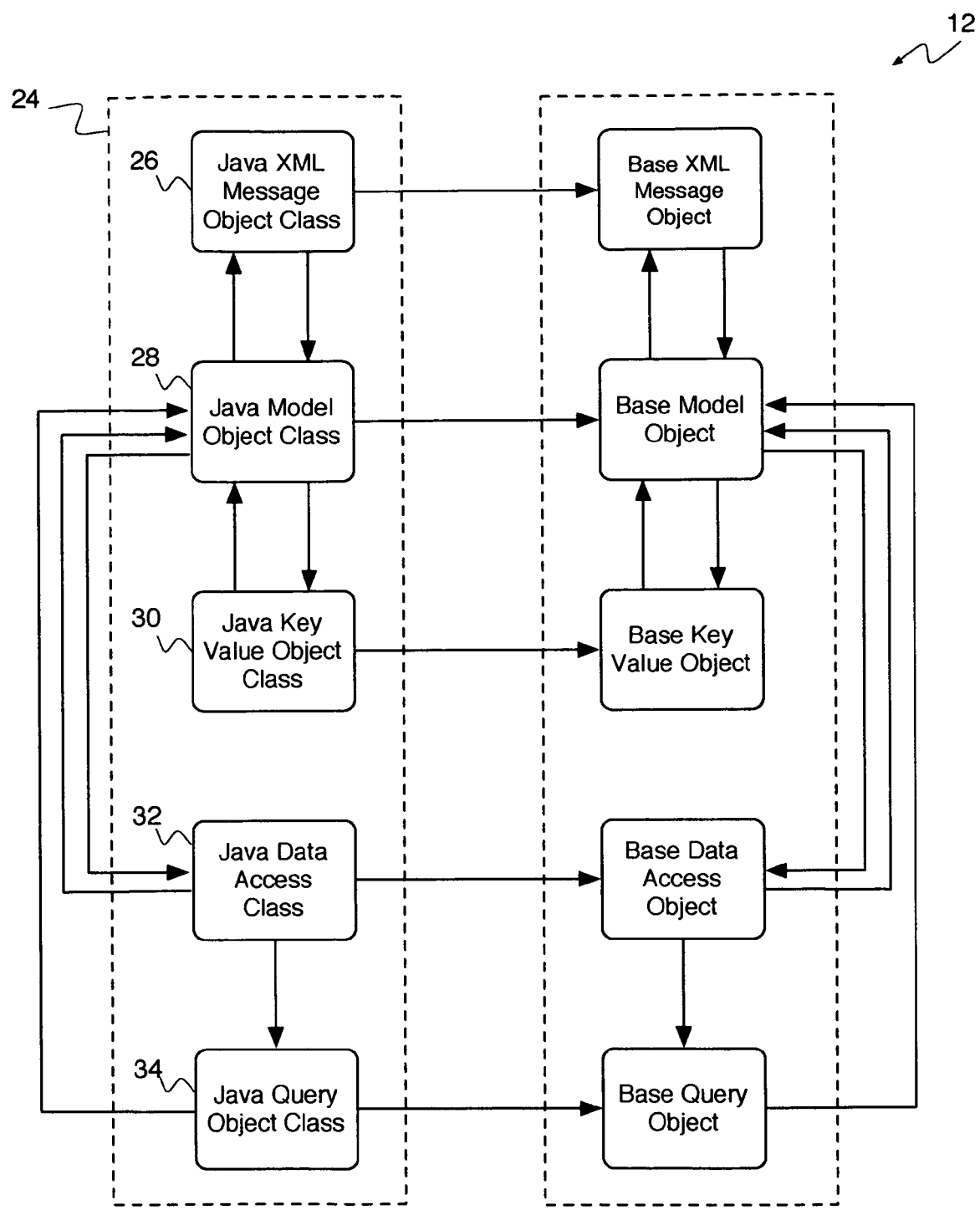
FIG. 4 is a schematic view of the generated objects in the Object-Service Framework.

As shown in FIG. 4, the Object-Service Framework 12 functions to define the base level code structures (i.e. base classes) that serve as the foundation for all generated objects from the XML schema files 18. The Object-Service Framework 12 preferably contains Java classes that serve as the foundation for all generated code and classes from the XML schema files 18. The Object-Service Framework 12 provides a set of classes that formulate the core abstractions. It also contains the relationships across these core abstractions. Almost all the reusable tasks for each type of Java Classes 24 are encapsulated within the classes in the Object-Service Framework 12. These abstractions encompass XML Message Objects, Model Objects, Data Access Objects, Query Objects, and Key Value Objects. All the generated code artifacts are derived or extended from these core abstractions. Preferably, the Java classes in the Object-Service Framework 12 cannot be modified. These Java classes are, however, used and extended through the Java Classes 24 generated by the Design Time Framework 10.

The Java XML Message Object Class Files 26 are based on the Base XML Message Object hierarchy. The Java XML Message Object Class Files 26 preferably contain methods to validate and convert XML formatted data into instances of the Java Model Object Class files 28 and, conversely, to convert and validate Java Model Object Class files 28 into XML formatted data. The validation of the XML formatted data takes place against the definition for the information structures defined in the XML schema file 18.

The Java Key Value Object Class files 30 are based on the Base Key Value Object hierarchy. The Java Key Value Object Class files 30 preferably contain methods to validate and convert key value formatted data into instances of Java Model Object Class files 28.

The Java Model Object Class files 28 are based on the Base Model Object class hierarchy. The Java Model Object Class files 28 preferably contain attributes reflecting the information structure defined in the XML schema and the respective methods to manipulate them, and contain details about their respective Java XML Message Object Class files 26 and Java Data Access Object Class files 32.

The Java Data Access Object Class files 32 are based on the Base Data Access Object class hierarchy. The Java Data Access Object Class files 32 function as a bridge between the Java Model Object Class file 28 and their respective persistent representation in the database such as a relational table. The Java Data Access Object Class files 32 preferably contain the database-oriented information necessary to store a Java Model Object Class file 28 instance in a database or to retrieve, modify or delete it from the database. Preferably, there are one or more Java Data Access Object Class files 32 for each persistent Java Model Object Class files 28. The database-oriented information preferably includes items such as Structured Query Language ("SQL") String, JDBC (Java Database Connectivity) statements, Data Manipulation Language ("DML") strings, respective column names, respective table names, and column related properties such as primary keys. The Java Data Access Object Class file 32 also preferably contains pointers to Java Model Object Class file 28 and the Java Query Object Class Files 34.

The Java Query Object Class files 34 are based on the Base Query Object hierarchy. The Java Query Object Class files 34 preferably contain the required database oriented information to persist a Java Model Object Class file 28 instance in a database or to retrieve, modify or delete it from the database using a specific database column or columns as a key. Preferably, there is one or more Java Query Object Class file 34 for each persistent Java Data Access Object Class File 32. The database-oriented information preferably includes items such as SQL String and JDBC statements, respective column names, respective table names, and column related properties such as primary keys. Interaction with the Java Query Object Class file 34 instance takes place through their respective Java Data Access Object Class file 32 instance.

4. OBJECT SERVICE FRAMEWORK—RUNTIME SERVICES

Figure 5:
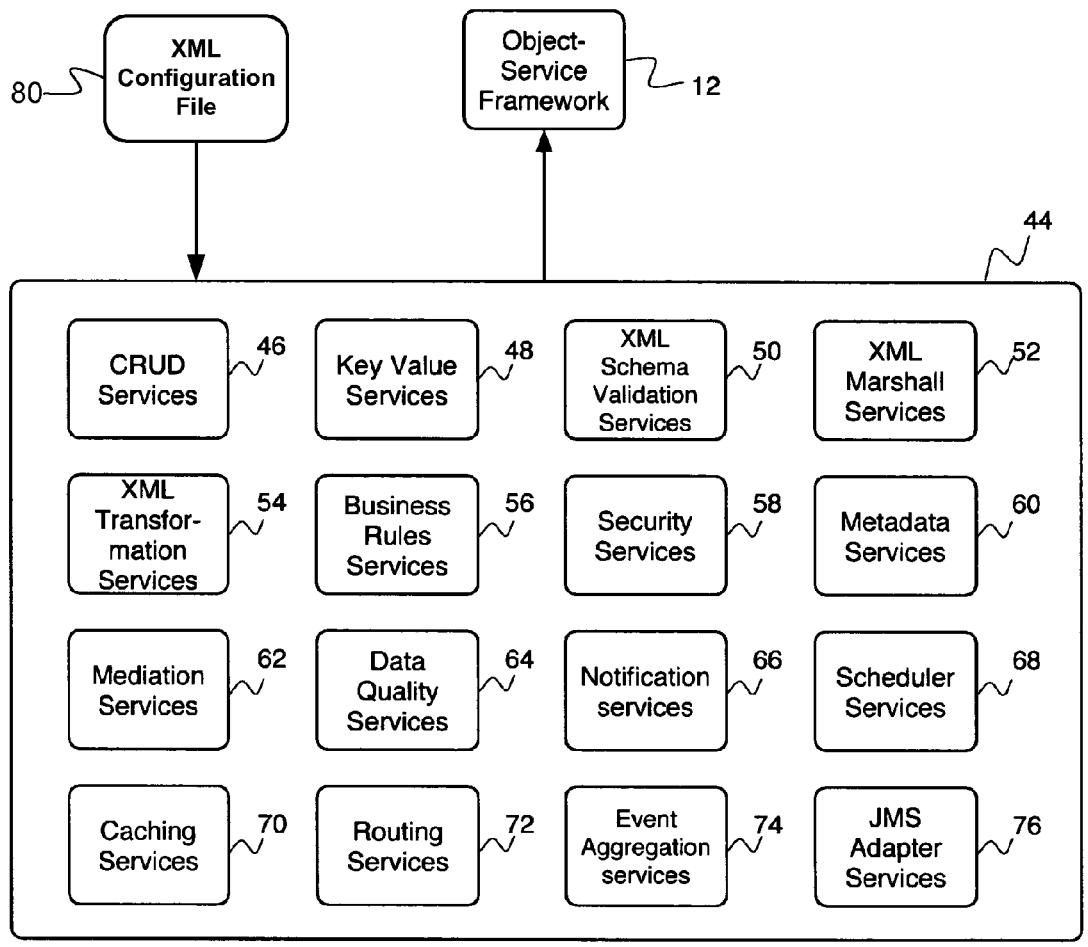
FIG. 5 is a schematic view of the runtime services in the Object-Service Framework.

As shown in FIG. 5, the Object-Service Framework 12 also defines a set of abstract methods and classes that formulate the core abstractions for the runtime services. Each run-time service extends this structure. Thus, the external interfaces for each run-time service contain a common set of interfaces regardless of the operations or functions they perform. The runtime services 44 interact with the Java code artifacts generated by the Design Time Framework 10 through the methods exposed by the Object-Service Framework 12. Stated differently, the runtime services 44 operate on the Java classes 24 at the Object-Service Framework 12 level and are not specific to the extensions of the generated Java Class 24.

The runtime services 44, which are initiated by the Processor 82, preferably include: CRUD Services 46, Key Value Services 48, XML Schema Validation Services 50, XML Marshall Services 52, XML Transformation Services 54, Business Rules Services 56, Security Services 58, Metadata services 60, Mediation Services 62, Data Quality Services 64, Notification Services 66, Scheduler Services 68, Caching Services 70, Routing Services 72, Event Aggregation Services 74, and the JMS (Java Message Service) Adapter Services 76. The runtime services 44 may include other suitable services.

The CRUD Services 46 function to provide a run-time method to interact with a persistent database to perform operations such as create, retrieve, update, or delete instances of information structures described in the XML schema models using the generated Java Model Object Class files 28 and Java Data Access Objects Class files 32. Preferably, the CRUD Services 46 use the database oriented information in the derived and generated instances of the Java Data Access Object Class files 32 and the Java Query Object Java Class files 34 to interface with the persistent database, perform any required preparation tasks (such building the SQL statements), perform the actual operation (such as create, retrieve, update or delete), and perform any required post operation tasks (such as converting the information from database oriented structures into Java Model Object Class files 28 structures). Alternatively, the CRUD Services 46 may perform any suitable task to perform operations such as create, retrieve, update, or delete instances of information structures described in the XML schema models.

The Key Value Services 48 function to provide a run-time method to validate and parse an incoming key-value (name-value) pair formatted data and convert it into a Java representation using the generated Java Key Value Object Class files 30 and Java Model Object Class files 28. Preferably, the Key Value Services 48 retrieve any dynamic properties in the XML Configuration Files 80, instantiate the desired 3rd party XML parsers (which are preferably supplied through the configuration properties in the XML Configuration Files 80), parse and validate incoming HTTPServletRequests against the XML schema structures defined in XML Schema file 18, and use the Java Key Value Class Files 30 to transform the key-value pair formatted data into Java Model Object Class Files 28. Alternatively, the Key Value Services 48 may perform any suitable task to validate and parse an incoming key-value (name-value) pair formatted data and convert it into a Java representation.

The XML Schema Validation Services 50 function to provide a run-time method to validate and parse an incoming XML formatted data and convert it into a Java representation using the generated Java XML Message Object Class files 26 and Java Model Object Class files 28. Preferably, the XML Schema Validation Services 50 retrieve any dynamic properties in XML Configuration Files 80, instantiate the desired 3rd party XML parsers (which are preferably supplied through configuration properties in XML Configuration Files 80), parse and validate incoming XML formatted data against the XML schema structures defined in XML Schema file 18, and use the Java XML Message Object Class files 26 to transform the XML formatted data into Java Model Object Class files 28. Alternatively, the XML Schema Validation Services 50 may perform any suitable task to validate and parse an incoming XML formatted data and convert it into a Java representation.

The XML Marshall Services 52 function to provide a run-time method to transform a Java representation into XML formatted data using the generated Java XML Message Object Class files 26 and Java Model Object Class files 28. Preferably the XML Marshall Services 52 retrieve dynamic properties in XML Configuration Files 80, and then convert the Java Model Object Class files 28 into XML formatted data using the Java XML Message Object Class files 26. The generated XML formatted data can be optionally validated (using dynamic properties in the XML Configuration Files 80) against the information structures defined in the XML schema file 18. Alternatively, the XML Marshall Services 52 may perform any suitable task to transform a Java representation into XML formatted data.

The XML Transformation Services 54 function to provide a run-time method to transform an XML formatted data into some other XML format or its derivative (such as HTML). Preferably, the XML Transformation Services 54 retrieve dynamic properties in XML Configuration Files 80, instantiate the desired 3rd party XML transformers (which are preferably supplied through configuration properties in XML Configuration Files 80), and transform the incoming XML data into a different XML data format or its derivative (such as HTML) using externally supplied rules for transformation defined in a language such as XSL. Alternatively, the XML Transformation Services 54 may perform any suitable task to transform an XML formatted data into some other XML format or its derivative (such as HTML).

The Business Rules Services 56 function to provide a run-time method to associate and execute business rules, defined in the XML base rules files, on instances of information structures described in the XML schema models, using the generated Java Model Object Class files 28 and Java Business Rules Object Class files 40. As explained above, the Java Business Rules Object Class files 40 encapsulate the specific Rule with its Condition and Action, and the Java Model Object Class files 28 encapsulates the specific Model Object on which the Action is executed by the service if the Condition is successfully evaluated by the service. Preferably, the Business Rules Services 56 obtain a specific rule (which would be executed dynamically and is preferably supplied through configuration properties in XML Configuration Files 80), and then interface with the base classes in the Base Business Rule Structure 42 to execute the specific rule. The rule defined in the configuration properties is used to determine the exact derived instance of the Java Business Rules Object Class files 40, but all the interaction is performed at an abstract level since classes extending the Java Business Rules Object Class files 40 implement all the abstract methods defined in the Base Business Rule Structure 42. The Business Rules Services 56 apply the business rule on the input Java Model Object Class files 28. Thus, the Business Rules Services 56 act as mediators between the rule conditions, rule actions, and the objects on whom the conditions are evaluated and actions are executed. The mediation steps are implemented in a generic fashion such that they can be used across any instances of the Java Business Rules Object Class files 40 and Java Model Object Class files 28. The business rules can also be defined to invoke any other service runtime services 44 including the Business Rules Services 56 itself. Additionally, the business rules can also be defined to conditionally invoke an entire web service event itself which is defined in the XML configuration file 80. As a result users can support any combination of conditional logic and behavioral response required to handle different requests.

The Security Services 58 function to provide a security framework and associated run-time method so that different types of security policies can be dynamically positioned to be executed at different points of the execution flow. The framework provides the ability to define and impose role based, resource based, operation based or completely contextual based security policies. Moreover, the security framework references the model object classes defined in the Object-Service Framework and is itself generated by the design-time code generation framework using an XML schema file. Additionally, the associated run-time service executes the configured security policy to protect access to the execution of other runtime services 44 in the run-time service framework or code artifacts generated by the design-time code generation framework. Preferably, the Security Services 58 obtain the security policy type, the operation, and the resource values in XML Configuration Files 80. Then, the Security Services 58 retrieve the role value and, optionally, the contextual map value from the Java Model Object Class files 28 for the respective information structures in the XML formatted data encapsulated in the incoming event. Based on these inputs, the Security Services 58 formulate the desired combination of role-resource-operation for the incoming event. Next, the Security Services 58 invoke the appropriate policy handler class that retrieves the possible combinations of role-resource-operation. Finally, the Security Services 58 check if the possible role-resource-operation combinations contain the resource-operation-operation combination desired or required for the incoming event. By using this method, access to a web service can be controlled via a security policy. Alternatively, the Security Services 58 may perform any suitable task so that different types of security policies can be dynamically positioned to be executed at different points of the execution flow.

The Metadata services 60 function to provide a run-time method to perform operations to manage the mappings of persistent Java Model Object Class files 28 across different persistent databases. Preferably, the Metadata services 60 define a semantic view based on the information structure defined in XML Schema file 18 and subsequently generated by the Design Time Framework 10, and maps this semantic view against the system specific views. This mapping is preferably accomplished by keeping cross-referencing information at the metadata level (such as the mappings between entities, mapping between different columns, and unique identifiers to keep the systems in synchronization). Alternatively, the Metadata services 60 may perform any suitable task to manage the mappings of persistent Java Model Object Class files 28 across different persistent databases.

The Mediation Services 62 function to provide a run-time method to perform mediation and interaction with multiple persistent databases to perform operations such as insert, retrieve, update or delete instances of information structures described in the XML schema models using the generated Java Model Object Class files 28 and Java Data Access Object Class files 32. The Mediation Services 62 preferably create, retrieve, update and delete information structures based on XML Schema file 18 from across databases, as opposed to a single database. The Mediation Services 62 are a collection of services that perform operations on objects which are instances of Java Data Access Object Class 32 objects, Java Query Object Class 34 objects, Java Model Object Class file 28 and Object-Service Framework 12. Thus, the Mediation Services 62 implement a series of steps to complete an operation against a virtual information structure whose whole is composed of information kept or housed in different persistent databases. The Mediation Services 62 preferably create a virtual view, which is preferably stored in read only memory in an application server (as opposed to a database server), that includes persistent information stored in different databases. The structure of virtual view schema itself is also preferably defined in XML Schema file 18 and subsequently generated by the Design Time Framework 10. Like CRUD Services, Mediation Services 62 utilize the database oriented information kept in Java Data Access Object Class files 32 and Java Query Object Class files 34 to interface with the database. The Mediation Services 62, however, also perform additional aggregate level functions to gather data or split data across different systems. Alternatively, the Mediation Services 62 may perform any suitable task to perform mediation and interaction with multiple persistent databases to perform operations such as insert, retrieve, update or delete instances of information structures.

The Data Quality Services 64 function to provide a run-time method to check the quality of information kept in a persistent database. The run-time method provides logic and steps to check for completeness, accuracy and validity of data kept in the persistent database by using pre-defined rules or rules defined using the Base Business Rule Structure 42. Preferably, the Data Quality Services 64 contain specific business rules and in-built semantics that check for quality associated information (such as duplicate, incomplete, invalid or missing fields in the databases). The logic for such checks is preferably implemented by separate handlers that are then invoked by the Data Quality Services 64. Thus, the Data Quality Services 64 preferably uses the Java Data Access Object Class files 32 and Java Query Object Class files 34 to fetch information about the Java Model Object Class files 28, and then passes the Java Model Object Class files 28 to the appropriate handlers. Alternatively, the Data Quality Services 64 may perform any suitable task to check the quality of information kept in a persistent database.

The Notification Services 66 function to provide a run-time method to send one-way notifications containing XML formatted data to other external systems using a variety of transport protocols such as HTTP, JMS, and SMTP. Preferably, the Notification Services 66 retrieve dynamic properties from the XML Configuration files 80, augment input XML formatted data with specific header properties (such as the request Id), and then send the XML formatted data asynchronously to other systems. The information about the systems is preferably obtained from the XML Configuration Files 80, but may alternatively be stored and retrieved from a database. Alternatively, the Mediation Services 62 may perform any suitable task to perform mediation and interaction with multiple persistent databases to send one-way notifications containing XML formatted data to other external systems.

The Scheduler Services 68 provides a run-time method to execute a collection of runtime services 44 at pre-defined time-intervals specified in a configuration file. The configuration file, which is preferably defined in XML Configuration Files 80, preferably includes a list of the pre-defined time-intervals and a list of the events that need to be executed at these pre-defined intervals. The Scheduler Service 60 then executes these events, preferably in the background, at pre-defined intervals invoking the Run Time Framework 14 with the event and the input XML formatted data. Alternatively, the Scheduler Services 68 may perform any suitable task to execute a collection of runtime services 44 at pre-defined time-intervals.

The Caching Services 70 function to provide a run-time method to cache the information previously retrieved from one or more persistent databases. The Caching Services 70 preferably interacts with the base methods and classes defined at the Cache Framework 29 level. The Cache Framework 29, which interacts with instances of Java Data Access Object Class files 32 and Java Model Object Java Class files 28 using the abstracted methods and constructs in the Object-Service Framework 12, provides abstracted structures that are implemented by the actual cache and the cache schema implementation. The properties of the cache (such as the caching schemes and cache size) are preferably kept in XML Configuration Files 80. The cache scheme may employ any suitable policies such as LRU (Least Recently Used), FIFO (First In First Out), or custom policies to manage instances of the Java Model Object Class files 28.

The Routing Services 72 function to provide a run-time method to route XML formatted data to different systems using the generated Java XML Message Object Class files 26 and Java Model Object Class files 28 as part of the routing operation. Preferably, the Routing Services 72 retrieve any dynamic properties from the XML Configuration files 80, read the input XML formatted data with specific header properties (such as the event name, originating application, or destination application), map that information against specific routing rules, and route the messages to one or more systems based on that map. The information about the systems and the routing table (which maps events to applications, and applications to their locations) is preferably obtained from the XML Configuration Files 80, but may alternatively be stored and retrieved from a database. Alternatively, the Routing Services 72 may perform any suitable task to perform mediation and interaction with multiple persistent databases to route XML formatted data to different systems.

The Event Aggregation Services 74 function to provide a run-time method to aggregate XML formatted data associated with multiple events into a larger structure for a single event, or to split XML formatted data associated with single event into multiple structures for multiple events using the generated Java XML Message Object Class files 26 and Java Model Object Class files 28. Preferably, the Event Aggregation Services 74 call the XML retrieve any dynamic properties in XML Configuration Files 80, retrieve the aggregation or splitting rule defined in either an XSL based file or a XML Business Rule File 22, and then apply that rule on the input XML formatted data. In case of aggregation, the Event Aggregation Services 74 collect information from multiple Java XML Message Object Class files 26 (obtained through an execution of multiple events) and transforms them into a single XML formatted data. In case of splitting, the Event Aggregation Services 74 split information from a single XML formatted file into multiple Java XML Message Object Class files 26 or XML formatted data blocks and maps each of them to a specific event for execution. Alternatively, the Event Aggregation Services 74 may perform any suitable task to aggregate XML formatted data associated with multiple events into a larger structure for a single event, or to split XML formatted data associated with single event into multiple structures for multiple events.

The JMS Adapter Services 76 function to provide a run-time method to send and receive messages in XML formatted data using Java Messaging Service ("JMS"). Preferably, the run-time method itself does not implement the JMS protocol. Instead it provides the steps to interface with a JMS provider in generic fashion using the Java XML Message Object Class files 26 and Java Model Object Class files 28. Alternatively, the run-time method can be configured in any suitable manner. Preferably, the JMS Adapter Services 76 retrieve any dynamic properties in XML Configuration Files 80, retrieve the properties for the 3rd Party JMS provider (which are preferably supplied through configuration properties in XML Configuration Files 80), and either listen for incoming XML formatted data or send XML formatted data. Alternatively, the JMS Adapter Services 76 may perform any suitable task to send and receive messages in XML formatted data using Java Messaging Service ("JMS").

The CRUD Services 46, the Key Value Services 48, the XML Schema Validation Services 50, the XML Marshall Services 52, the XML Transformation Services 54, the Business Rules Services 56, the Security Services 58, the Metadata services 60, the Mediation Services 62, the Data Quality Services 64, the Notification Services 66, the Scheduler Services 68, the Caching Services 70, the Routing Services 72, the Event Aggregation Services 74, and the JMS Adapter Services 76 are preferably extensions of the Object-Service Framework 12 and, thus, respect the public level contracts defined in the Object-Service Framework 12. Further, the specific operations of these are preferably kept internal to the implementation of the service and are preferably implemented in a generic fashion such that they can be used across any instances of the XML Schema file 18 and its generated code artifacts.

In the preferred embodiment, the runtime services 44, which are initiated by the Processor 82, also include a Custom Services. The Custom Services function to provide a method to build custom runtime services 44 through an extensible interface that extends the base run-time service defined in the Object-Service Framework 12. The Custom Services provide APIs to build custom runtime services 44 that inherit the same underlying characteristics that the other runtime services 44 inherit from the Object-Service Framework 12.

5. RUN TIME FRAMEWORK

Figure 6:
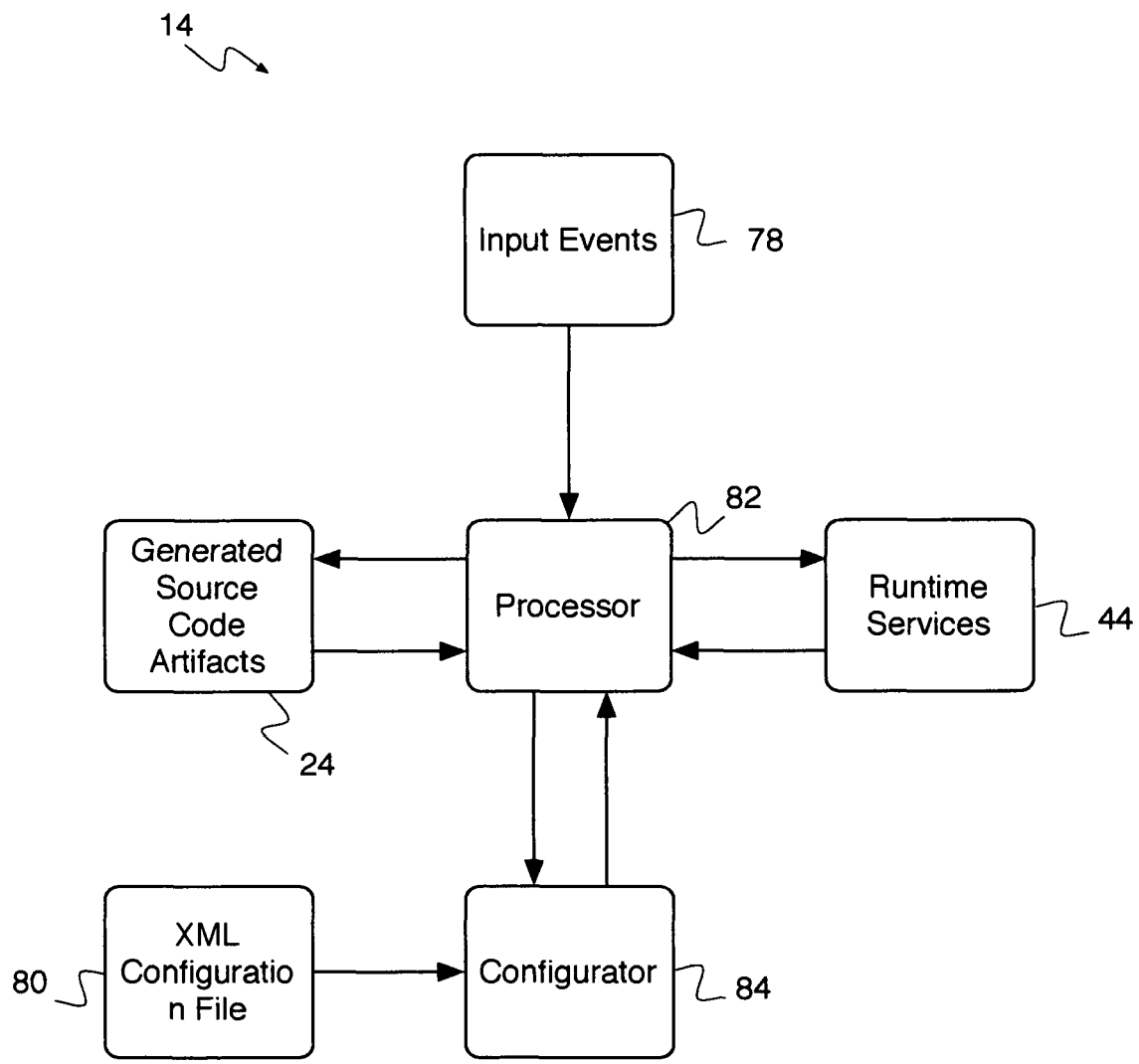
FIG. 6 is a schematic view of the Run Time Framework.

As shown in FIG. 6, the Run Time Framework 14 functions to enable users to dynamically configure and control events, business processes, and run-time service at deployment. The Run Time Framework 14 preferably includes a Processor 82 and a Configurator 84. The Run Time Framework 14 may include other modules, such as a Cache, or any other suitable modules to enable users to dynamically configure and control one or more of the runtime services 44.

In the preferred embodiment, the Processor 82 accepts an incoming event 78 (sent over a network), gets and interprets the execution flow from the Configurator 84, extracts the runtime services 44, extracts the generated source code artifacts from the Code Generator 16, and then executes the runtime services 44. The Processor 82 preferably uses the abstracted structures defined in the Object-Service Framework 12, and also preferably mediates the interaction and enables loose-coupling between different runtime services.

In the preferred embodiment, the Configurator 84 receives the XML Configuration files 80 from the end user, receives the request from the Processor 82, and maps the incoming event to an execution flow in the XML Configuration Files 80. The XML Configuration Files 80 define the order in which the end user wants to execute the runtime services 44. Preferably, each event can be mapped to a collection of one or more events, business processes, or runtime services, and each business process can be mapped to a collection of one or more runtime services.

In an alternative embodiment, the Processor 82 accepts an incoming event 78 (sent over a network) and the XML Configuration file 80. Thus, both the event (which requires a web service) and the assembly configuration (which has the steps to assemble a web service) are both submitted in real-time. This alternative embodiment would allow assembly of web services "on-the-fly." As a variation on this embodiment, the Processor 82 may accept a modification of the XML Rules File 22 in the Design Time Framework 14, which would allow "on-the-fly" modification of the business rules. In this variation, the Code Generator 16 may generate new Java Business Rules Object Class files 40 based on this new and/or modified XML Rules files 22 and the Processor 82 may interact with this new Java Business Rules Object Class file 40.

In another alternative embodiment, some of the runtime services 44 may reside on different machines. Thus, in this mode, the entire run-time execution (e.g., the run-time service and the run-time configuration information) is distributed, and yet the flow is orchestrated via the Run Time Framework 14.

6. EXAMPLE

In Step 1 of the Design Time Framework 10, the user defines the XML Schema File 18 and the XML Business Rule File 22 inputs. The XML Schema File 18 follows:

```
<xs:schema xmlns:xs="http://www.w3.org/2001/XMLSchema"
elementFormDefault="qualified" attributeFormDefault="unqualified">
  <xs:complexType name="EventType">
    <xs:attribute name="eventName" type="xs:string"/>
  </xs:complexType>
  <xs:complexType name="CustomerType">
    <xs:sequence>
      <xs:element name="name" type="xs:string"/>
      <xs:element name="status" type="xs:string"/>
      <xs:element name="discount" type="xs:int"/>
    </xs:sequence>
    <xs:attribute name="id" type="xs:int"/>
  </xs:complexType>
  <xs:element name="Event" type="EventType"/>
  <xs:element name="Customer" type="CustomerType"/>
</xs:schema>
```

The XML Business Rule file 22, which sets the Customer discount to "10" percent if the Customer status is "Premier", follows:

```
<Rules xmlns="urn::localhost:eosRules"
xmlns:xsi="http://www.w3.org/2001/XMLSchema-instance"
xsi:schemaLocation="urn::localhost:sampleRules
C:\sample\rules.xsd">
  <Rule name="getCustomer">
    <AndCondition>
      <AndStateSet>
        <State name="checkStatus">
          <EqualToComparator/>
            <Lhs modelObject="Customer" attribute="_status"/>
            <Data data="Premier"/>
        </State>
      </AndStateSet>
    </AndCondition>
    <Action>
      <ActionItem xsi:type="AssignType">
        <Lhs modelObject="Customer" attribute="discount"/>
        <Data data="10"/>
      </ActionItem>
    </Action>
  </Rule>
</Rules>
```

In Step 2, the Design Time Framework 10 calls the Code Generator 16 that examines the XML Schema File 18 to generate the following Java classes 24: Java XML Message Object Class Files 26, Java Model Object Class files 28, Java Key Value Object Class files 30, Java Data Access Object Class files 32, and Java Query Object Class files 34. It also generates the SQL DDL File 38. It also examines the XML Business Rule File 22 to generate the Java Business Rules Object Class files 40.

In Step 3, the Design Time Framework compiles the generated code into binary files.

In Step 4, the customer schema is created in a relational database using the SQL DDL File 38.

In Step 5, the runtime configuration in XML Configuration File 80 is defined. In the first XML Configuration File 80, the event response flow is defined as:

```
<Event name="get">
  <BusinessProcessExecution name="getProcessFlow"/>
</Event>
<BusinessProcess name="getProcessFlow">
  <ServiceExecution name="SchemaValidationService"/>
  <ServiceExecution name="RetrieveService">
    <ServiceExecutionProperty name="index" value="id"/>
  </ServiceExecution>
  <ServiceExecution name="BusinessRuleService">
    <ServiceExecutionProperty name="ruleName"
    value="getCustomer"/>
  </ServiceExecution>
  <ServiceExecution name="XMLMarshallService"/>
</BusinessProcess>
```

In a second XML Configuration File 80, the configuration definition is provided for each of the three Runtime Services 44 used to respond to the input event:

```
<schemaValidationServiceDefinition name="SchemaValidationService">
  <runTimeClassName/>
  <schemaSource>customer.xsd</schemaSource>
</ schemaValidationServiceDefinition>
<retrieveServiceDefinition name="RetrieveService">
```

-continued

```
    <runTimeClassName/>
    <datasource>sample_datasource</datasource>
</retrieveServiceDefinition>
<ruleServiceDefintion name="BusinessRuleService">
    <runTimeClassName/>
</ruleServiceDefinition>
<xmlMarshallServiceDefinition name="XMLMarshallService">
    <runTimeClassName/>
</xmlMarshallServiceDefinition>
```

In the Run Time Framework 14, the requesting system could send a "get" event request 78 in a XML envelope as:

```
<Envelope>
    <Event name="getCustomer"/>
    <Customer id="1">
</Envelope>
```

In Step 1 of the Run Time Framework 14, the Processor 82 gets the execution flow from the Configurator 84. When the "get" Event 78 is received by the Run Time Framework 14, the Processor 82 requests the Configurator 84 for the execution flow for that event. The Configurator 84 reads the definition for the event "get" and for the required runtime services 44 from the XML configuration Files 80.

In Step 2, the Processor 82 interprets the execution flow. The Processor 82 extracts each service in the sequence specified in the execution flow. If the service is not available, it requests that services's configuration from the Configurator 84 and creates the service with that specified configuration.

In Step 3, the Processor 82 executes each service in the execution flow. The Processor 82 executes: (1) XML Schema Validation Services 50 to parse the incoming XML and convert it into object structure, (2) Retrieve Service 46 to get information from a database for a customer with id="1" and convert it from a database structure to an object structure, (3) Business Rule Services 56 to invoke a rule named "getCustomer" on the object structure that sets the discount field to "10" if the status field is "Premier", and (4) XML Marshall Services 52 to convert the object information back into XML.

In Step 4, the Processor 82 sends the XML response back to the requesting system. The requesting system gets an XML structure such as:

```
<Envelope>
    <Customer id="1">
        <name>John Doe</name>
        <status>Premier</status>
        <discount>10</discount>
    </Customer>
</Envelope>
```

The user can further extend or modify the behavior of the response to the event by defining new inputs or modifying the current inputs. Following are some of the different ways to accomplish this: (1) Extend the system to "get" new type of information such as "Address." The user simply provides a new XML schema and XML rule input for "Address" and generates code using the Design Time Framework 10. The XML Configuration files do not change i.e. the same configuration can be reused for every new type of business information. As a typical system might have thousands of such business information types, this approach results in tremendous time and cost savings. (2) Alter the behavior of the "get" event. If response to "get" event needs to be altered to include an authorization step, then XML Configuration flow could be altered to include a step before the Retrieve service that calls the Security Services 58. In other words, the response behavior can be rapidly changed at once across thousands of different business information types through a mere configuration change. This accords tremendous reusability in complex systems that desire to change responses to events on the fly. (3) Include event processing that is specific to business information. If event processing needs to be specific to the "Customer" or the "Address", the user can achieve that by either defining an flow for each type of information (for example getAddress flow or getCustomer flow), or the user can encapsulate this behavior in the rules (for example getCustomer rule or getAddress rule). (4) Alter the business logic of the event response by providing a different rule. If the user wants to use a different rule (for example getPremierAndGoldCustomer rule) to calculate the discount provided to the customer, they can simply define and generate a new rule and provide this new rule name to the "ruleName" property of the Business Rules Service. In this way, users can rapidly modify and augment the business logic through automated generation and configuration without disturbing rest of the application. This accords tremendous business flexibility and agility.

As a person skilled in the art of web services will recognize from the previous detailed description and from the figures and claims, modifications and changes can be made to the preferred embodiments of the invention without departing from the scope of this invention defined in the following claims.

I claim:

1. A system for developing web services that incorporates business rules, comprising:

a Design Time Framework including a code generator that receives a first set of configuration files from a user and generates source code artifacts in an object oriented programming language based on the received first set of configuration files, wherein the first set of configuration files comprises an XML schema file, an XML descriptor file, and an XML business rule file, wherein the XML schema file comprises XML schema annotations specifying properties of fields in the XML schema file, wherein an output of the Design Time Framework results from a compiling of the source code artifacts in an object oriented programming language based on the XML schema file, and the output comprises binary objects in a binary format and having field properties specified by the XML schema annotations;

an Object-Service Framework that receives a second set of configuration files from the user, wherein the Object-Service Framework comprises a set of pre-built runtime services, wherein each of the pre-built runtime services extends the Object-Service Framework and comprises binary code that was compiled before the compiling of the source code artifacts of the Design Time Framework in an object oriented programming language based on the XML schema file, wherein behaviors of the pre-built runtime services can be dynamically changed using the second set of configuration files, and wherein the Object Service Framework defines an application program interface (API) for each of the pre-built runtime services and wherein the pre-built runtime services interact with the source code artifacts of the Design Time Framework through the application program interface and wherein the pre-built runtime services extend the application program interface, and for a business rule service, the Object-Service Framework searches the output of the Design Time Framework and retrieves dynamic properties specified in the second set of configuration files to execute a business rule in the XML business rule file, for CRUD services of the pre-built runtime services that extend the Object-Service Framework, the Object-Service Framework searches the output of the Design Time Framework to perform on a persistent database of the system at least one of create, retrieve, update, or delete instances of information structures, wherein information is passed between the CRUD services and source code artifacts of the Design Time Framework by way of the application program interface (API) of the Object Service Framework, for security field services of the pre-built runtime services that extend the Object-Service Framework, the Object-Service Framework searches the output of the Design Time Framework and obtains security policy types, security policy operations, and resource values in the second set of configuration files to control the access to the web service and fields of the web service, wherein information is passed between the security field services and source code artifacts of the Design Time Framework by way of the application program interface (API) of the Object Service Framework, for an XML marshall service that extend the Object-Service Framework, the Object-Service Framework searches the output of the Design Time Framework and retrieves dynamic properties specified in the second set of configuration files to create XML formatted data having a first XML format, wherein information is passed between the XML marshall service and source code artifacts of the Design Time Framework by way of the application program interface (API) of the Object Service Framework, for an XML transformation service that extend the Object-Service Framework, the Object-Service Framework searches the output of the Design Time Framework to transform the created XML formatted data having the first XML format to XML formatted data having a second XML format, different from the first XML format, wherein information is passed between the XML transformation service and source code artifacts of the Design Time Framework by way of the application program interface (API) of the Object Service Framework, for an XML schema validation service that extend the Object-Service Framework, the Object-Service Framework searches the output of the Design Time Framework and retrieves dynamic properties specified in the second set of configuration files to validate and convert an input XML formatted data into an instance of the binary form of the Design Time Framework, wherein information is passed between the XML schema validation service and source code artifacts of the Design Time Framework by way of the application program interface (API) of the Object Service Framework, and for a key value service that extend the Object-Service Framework, the Object-Service Framework searches the output of the Design Time Framework and retrieves dynamic properties specified in the second set of configuration files to validate and convert data formatted as name-value pair into an instance of the binary output form of the Design Time Framework, wherein information is passed between the a key value service and source code artifacts of the Design Time Framework by way of the application program interface (API) of the Object Service Framework; and a Run Time Framework, running on a machine including a processor, that comprises pre-built binary code, wherein in response to an incoming event for the web service, the Run Time Framework retrieves from the second set of configuration files a selection of the pre-built runtime services to be placed in a flow for the web service, a selection of business rules specified in the XML business rule file, and an order in which the selected business rules will be evaluated for the flow of the web.

2. The system of claim 1 wherein the web service is a first web service, the XML business rule file is a first XML business rule file, and the Design Time Framework receives a second XML business rule file, different from the first XML business rule file, wherein the Run Time Framework generates a flow for a second web service, different from the first web service, using the second XML business rule file, and without alteration of the set of pre-built runtime services.

3. The system of claim 1 wherein the XML business rule file is a first XML business rule file, and in response to a first incoming event, the Run Time Framework generates a first web service using rules of the first XML business rule file and a first subset pre-built runtime business rule service of the set of pre-built runtime services, after the Run Time Framework generates the first web service, the Design Time Framework receives a second XML business rule file, different from the first XML business rule file, and in response to a second incoming event, the Run Time Framework generates a second web service using rules of the second XML business rule file and the first subset pre-built runtime business rule service of the set of pre-built runtime services.

4. The system of claim 3 wherein the first web service is different from the second web service.

5. The system of claim 1 wherein in response to a first incoming event, the Run Time Framework generates a first web service using one of a first pre-built runtime business rule service or a second pre-built business rule runtime service.

6. The system of claim 1 wherein in response to a first incoming event, the Run Time Framework generates a first web service using a first subset of the set of pre-built runtime services and not using a second subset of the set of pre-built runtime services.

7. The system of claim 6 wherein the second set of configuration files specifies that the first subset of the set of pre-built runtime services is to be used to generate the first web service.

8. The system of claim 6 wherein the second set of configuration files specifies that the second subset of the set of pre-built runtime services is not to be used to generate the first web service.

9. The system of claim 3 wherein the first web service is in response to a first input event and the second web service is in response to a second input event, different from the first input event.

10. The system of claim 1 wherein the pre-built runtime services respect a public level contract defined in the Object-Service Framework and wherein the specific operations of the pre-built runtime services are kept internal to the implementation of the pre-built runtime service wherein the pre built runtime service.

11. The system of claim 1 wherein the at least one specific operation of the CRUD services performed on the persistent database of the system is kept internal to the implementation of the pre-built runtime service.

12. The system of claim 1 wherein the CRUD services perform on the persistent database of the system at least one of create, retrieve, update, or delete instances of information structures without using a web service.

13. The system of claim 1 wherein the CRUD services perform on the persistent database of the system at least one of create, retrieve, update, or delete instances of information structures without passing through the Web.

14. The system of claim 1 wherein each pre-built runtime service comprises a runtime method.

* * * * *